United States Patent [19]
Turner et al.

[11] 3,735,978
[45] May 29, 1973

[54] METHOD AND APPARATUS FOR STACKING COPY SHEETS

[75] Inventors: Lyman H. Turner, Pittsford; Rhinehart A. Manzek, Rochester, both of N.Y.

[73] Assignee: Xerox Corporation, Stamford, Conn.

[22] Filed: Sept. 9, 1970

[21] Appl. No.: 70,736

[52] U.S. Cl. .................................... 271/88, 271/80
[51] Int. Cl. ........................................... B65h 29/22
[58] Field of Search ........................... 271/88, 87, 86

[56] References Cited
UNITED STATES PATENTS

2,742,286  4/1956  Williams et al. ................. 271/87 X
2,925,271  2/1960  Faeber ............................. 271/87
3,166,313  1/1965  Rehm ............................... 271/86

Primary Examiner—Joseph Wegbreit
Attorney—James J. Ralabate, Norman E. Schrader and Melvin A. Klein

[57] ABSTRACT

A system for producing finished sets of collated copies from precollated documents fed and copied in repeated cycles including a side stacking assembly for grouping sheets into separately identifiable stacks by the action of pivotable paddle wheels. A control logic enables side stacking the sheets into separately identifiable bundles.

6 Claims, 19 Drawing Figures

FIG. 1

INVENTORS.
LYMAN H. TURNER
RHINEHART A. MANZEK
BY Melvin A. Klein
ATTORNEY

METHOD AND APPARATUS FOR STACKING COPY SHEETS

This invention relates to apparatus for automatically stacking sheets into separately identifiable bundles.

As is well known in the art of bookmaking, it is generally necessary to first print or copy sheets and then gather groups of different sheets in a definite order referred to as collating. The operation of printing and then assembling sheets usually requires several steps, the last of which is taking one sheet from each of a number of stacks and putting these sheets together in the order desired.

Normally the assembling of sheets into booklets by hand is slow and cumbersome. Also, the number of people necessary is considerable and the likelihood of making a mistake great.

Present devices for mechanically assembling sheets into booklet form have the disadvantage of being prolix and costly and have not been entirely satisfactory.

The present invention enables automatic assembling of sheet material into separate identifiable stacks which may be fastened into a finished form. To accomplish this, a finishing apparatus accepts copy sheets from a processor and stacks them in separated bundles by the action of a pivotable paddle assembly.

It is therefore an object of the present invention to improve the printing of booklets.

It is another object of the present invention to stack collated sets of copy sheets printed from a processor in a manner more simple and cheaper than heretofore.

It is another object of the present invention to collect copy sheets from a processor into separated identifiable stacks.

It is another object of the present invention to provide a system for producing collated sets of copies from a precollated document input to be cyclically reproduced.

It is another object of the present invention to provide method and apparatus for stacking sheet material in a manner more expeditious than heretofore.

These objects as well as others will become more apparent upon considering the following description which is to be read in conjunction with the accompanying drawings in which:

FIG. 4(a)-(c) are end sectional views illustrating the various positions for the cover of the finishing apparatus;

FIGS. 7(a)-(c) illustrate in sequence the action of a rotating paddle wheel on moving sheet material;

GENERAL

Figure 1:
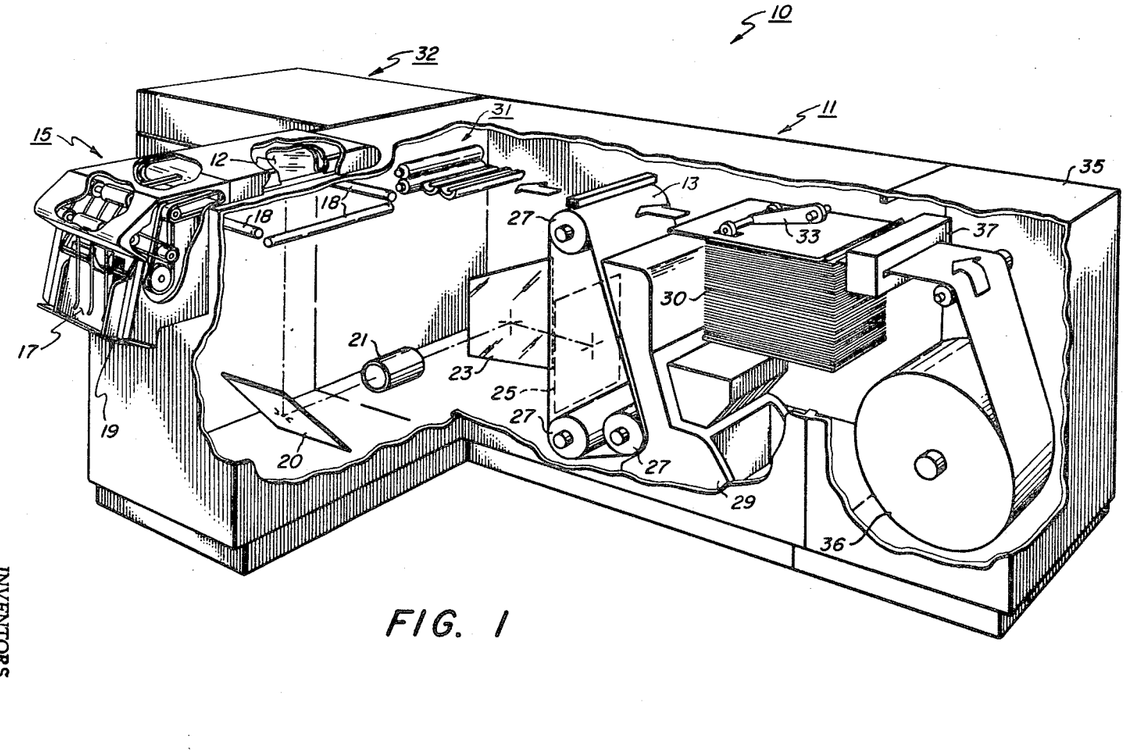
FIG. 1 is a perspective view of a copying machine incorporating a finishing apparatus according to the present invention.

For a general understanding of reproduction apparatus with which the present invention may be incorporated, reference is made to FIG. 1 wherein various components of a typical electrostatic printer system are illustrated. The printer system is of the xerographic type and is generally designated with the reference numeral 10. As in all xerographic systems, a light image of an original to be reproduced is projected onto the sensitized surface of a xerographic plate to form an electrostatic latent image. Thereafter, the latent image is developed with toner material to form a xerographic powder image corresponding to the latent image on the plate surface. The powder image is then electrostatically transferred to a record material such as a sheet or web of paper or the like to which it may be fused by a fusing device whereby the powder image is caused permanently to adhere to the surface of the record material.

The xerographic processor indicated by the reference numeral 11 is arranged as a self-contained unit having all of its processing stations located in a unitary enclosure or cabinet. The printer system includes an exposure station at which a light radiation pattern of a document to be reproduced is positioned on a glass platen 12 for projection onto a photoconductive surface in the form of a xerographic belt 13. The document is transported by a recirculating document feed apparatus 15 from the bottom of a stack 17 on a supply tray 19 to the platen for exposure and then returned to the top of the supply tray on completion of the exposure until the entire stack has been copied at which time the cycle may be repeated as described in copending U.S. application Ser. No. 781,287, filed on Dec. 4, 1968, now issued as U.S. Pat. No. 3,556,512 entitled Document Feed Apparatus and commonly assigned with the present invention.

Imaging light rays from the document as flash illuminated by lamps 18 are projected by a first mirror 20 and a projection lens 21 and another mirror 23 onto the belt 13 at the focal plane for the lens 21 at a position indicated by the dotted line 25.

As an interface structure and for unobstructive optical projections, the side of the cabinet is formed with an enlarged rectangular opening to permit the projection of image light rays from the lens 21 to the mirror 23. Similarly, the cabinet supporting the document plane is formed with a corresponding rectangular opening that mates with the opening in the printer cabinet when the two cabinets are operatively joined together for copy/duplicating purposes. Suitable light tight gaskets may be utilized adjacent the exterior of each opening in the cabinets in order to minimize the leakage of unwanted extraneous light.

The xerographic belt 13 is mounted for movement around three parallel arranged rollers 27 suitably mounted in the frame of processor 11. The belt may be continuously driven by a suitable motor (not shown) and at an appropriate speed corresponding to the discharge responsive the photoconductive material that comprises the belt and the intensity of the imaging light rays from the document. The exposure of the belt to the imaging light rays from the document discharges the photoconductive layer in the area struck by light whereby there remains on the belt an electrostatic latent image of figuration corresponding to the light image projected from the document. As the belt continues its movement, the electrostatic latent image passes a developing station at which there is positioned a developer apparatus 29 for developing the electrostatic latent image. After development, the powdered image is moved to an image transfer station whereat record material or sheet of paper just previously separated from a stack of sheets 30 is held against the surface of the belt to receive the developed powder image therefrom. The sheet is moved in synchronism with the movement of the belt during transfer of the developed image. After transfer, the sheet of paper is conveyed to a fusing station where a fuser device 31 is positioned to receive the sheet of paper for fusing the powder thereon. After fusing of the powder image, the sheet is conveyed through an opening in the cabinet to a finishing apparatus 32 for stapling or side stacking in a manner as will be described more fully hereinafter. The sheets are separated from the stack and fed from the top of the stack by means of a separator roll device 33 and timed sequence of the movement of the developed latent images on the belt 13.

Further details of the processing devices and stations in the printer system are not necessary to understand the principles of the present invention. However, a detailed description of these processing stations and components along with the other structures of the machine printer are disclosed and copending application Ser. Nos. 731,934, filed May 24, 1968, now issued as U.S. Pat. No. 3,661,452 and 756,598, filed Aug. 30, 1968, now issued as U.S. Pat. No. 3,597,071 which are commonly assigned with the present invention.

It will be appreciated that the printer system may be operated in conjunction with a roll converter unit indicated by the reference numeral 35. The roll converter unit 35 is adapted to convert a relatively large roll of paper 36 into various sizes of sheets of paper by means of a cutter device 37 and a suitable control system (not shown) arranged to control cutting and feeding of the individual sheets into operative cooperation with the separator roller 23. It will be appreciated that operative cooperation is assured between the various units operating with the printer system by the physical association of the cabinets for the units and the matching openings which enable full cooperation of the imaging light rays and sheet transport path between the units. In this regard, locking clamps may be provided on all the units for preventing the inadvertent movement of such units during use and interlocks which is an alignment device may be utilized on each unit for ensuring upper alignment and to terminate or suspend operation in the event mis-alignment or separation of the units occur. For facility and needs of operation, each of the units provided with caster wheels and locking brakes thereby aiding in the movement of the units into and out of cooperative engagement.

FINISHING APPARATUS

Figure 2:
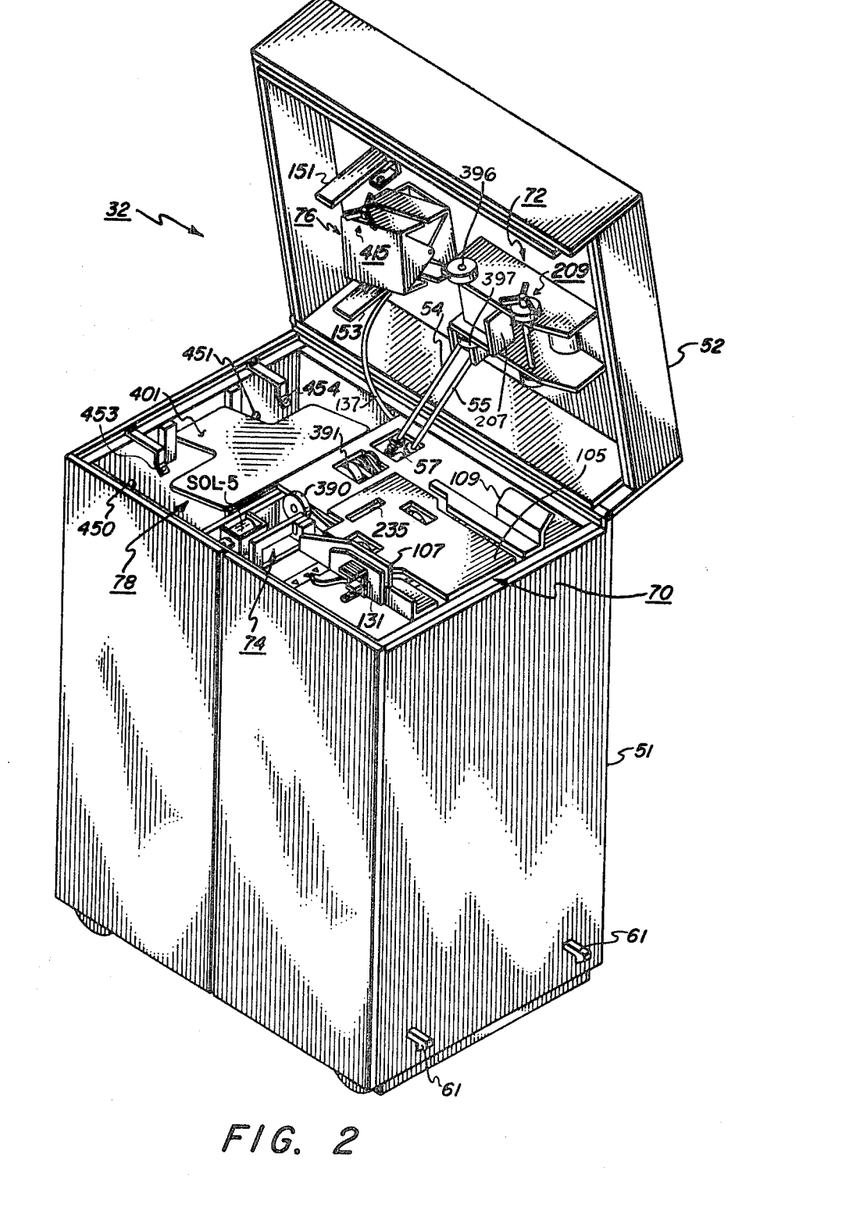
FIG. 2 is an isometric view of the exterior of the finishing apparatus.
Figure 3:
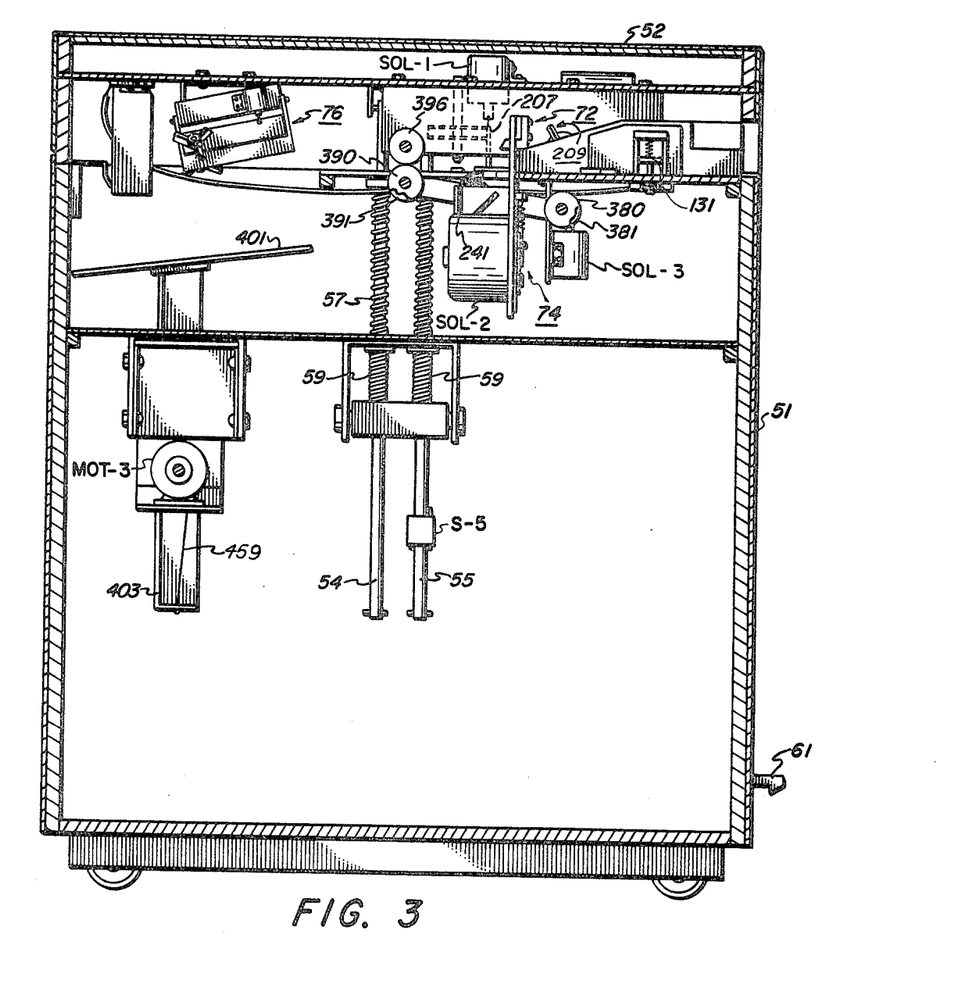
FIG. 3 is a side sectional view of the finishing apparatus.
Figure 4:
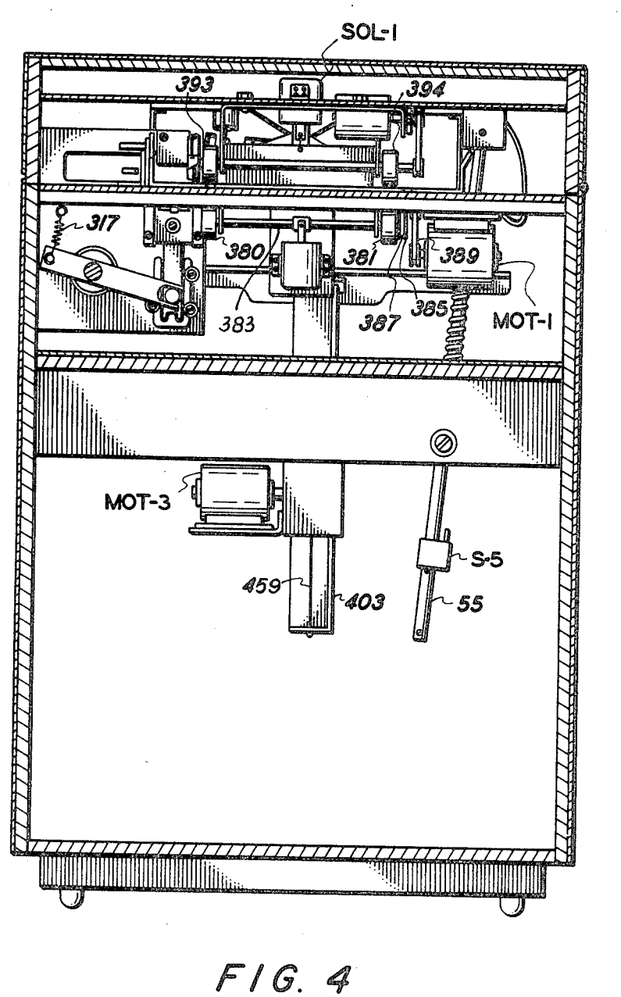
FIG. 4 is an end sectional view of the finishing apparatus.
Figure 4A:
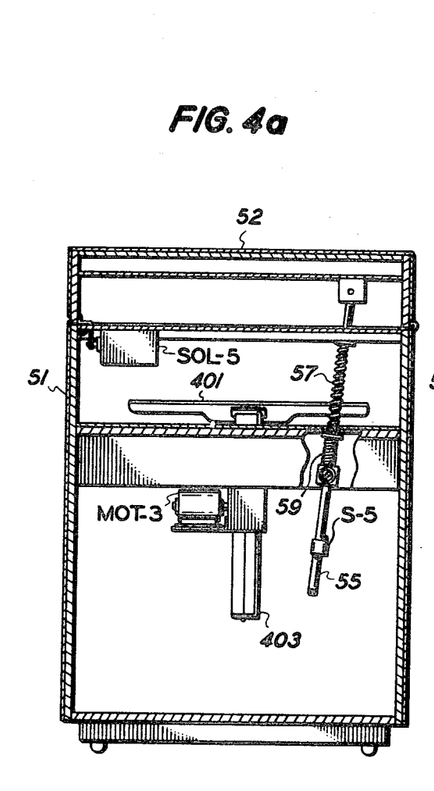
Figure 4B:
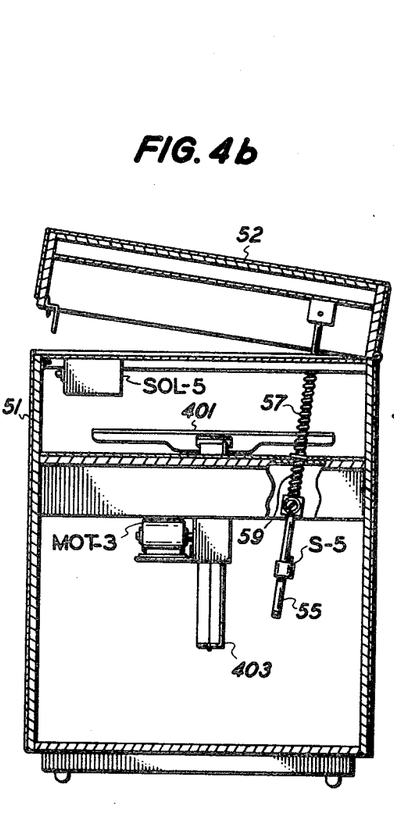
Figure 4C:
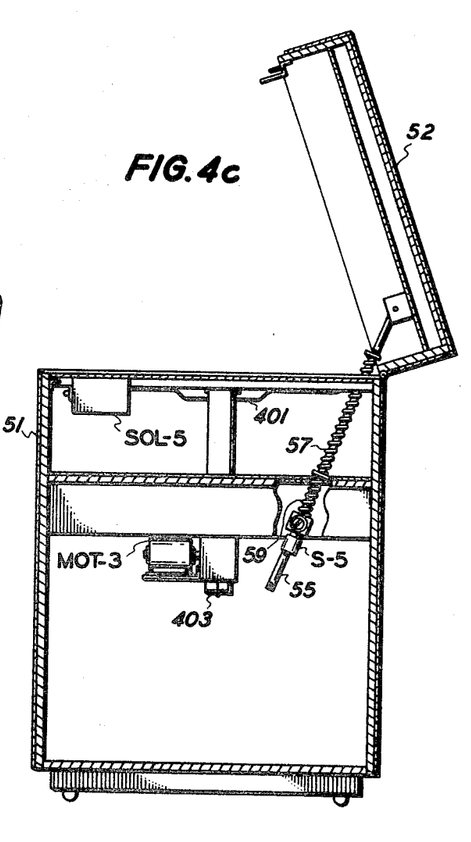

The finishing apparatus 32 comprises a frame having a main body housing 51 and cover 52 which is connected to the frame by rods 54 and 55 against the action of spring sets 57 and 59 encircling the rods to enable a pop open position of the cover as well as a fully raised position to permit access into housing 51 as will become more apparent. Housing 51 has hook members 61 extending from the lower portion to secure the frame to the processor 11 as previously mentioned.

Figure 5:
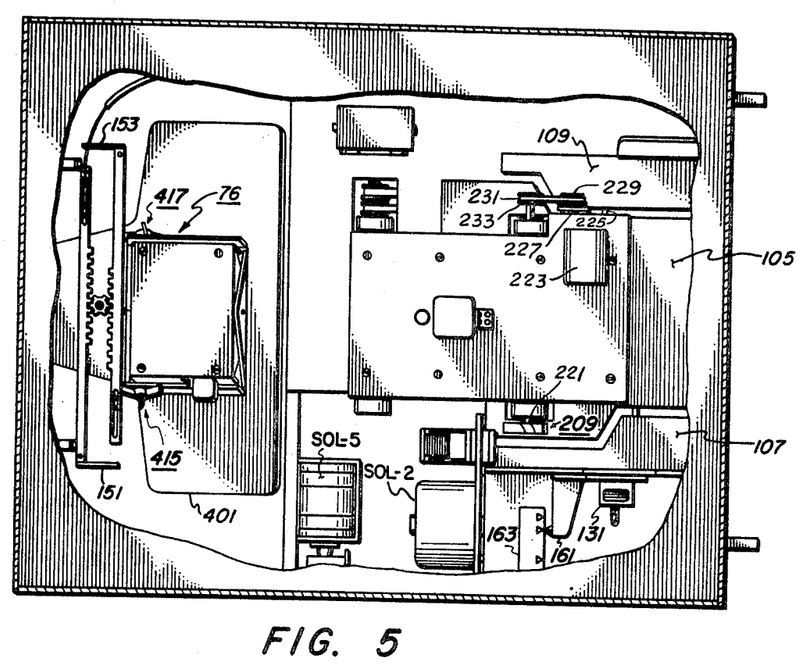
FIG. 5 is a plan view of the finishing apparatus with parts in section to illustrate certain details thereof.
Figure 6:
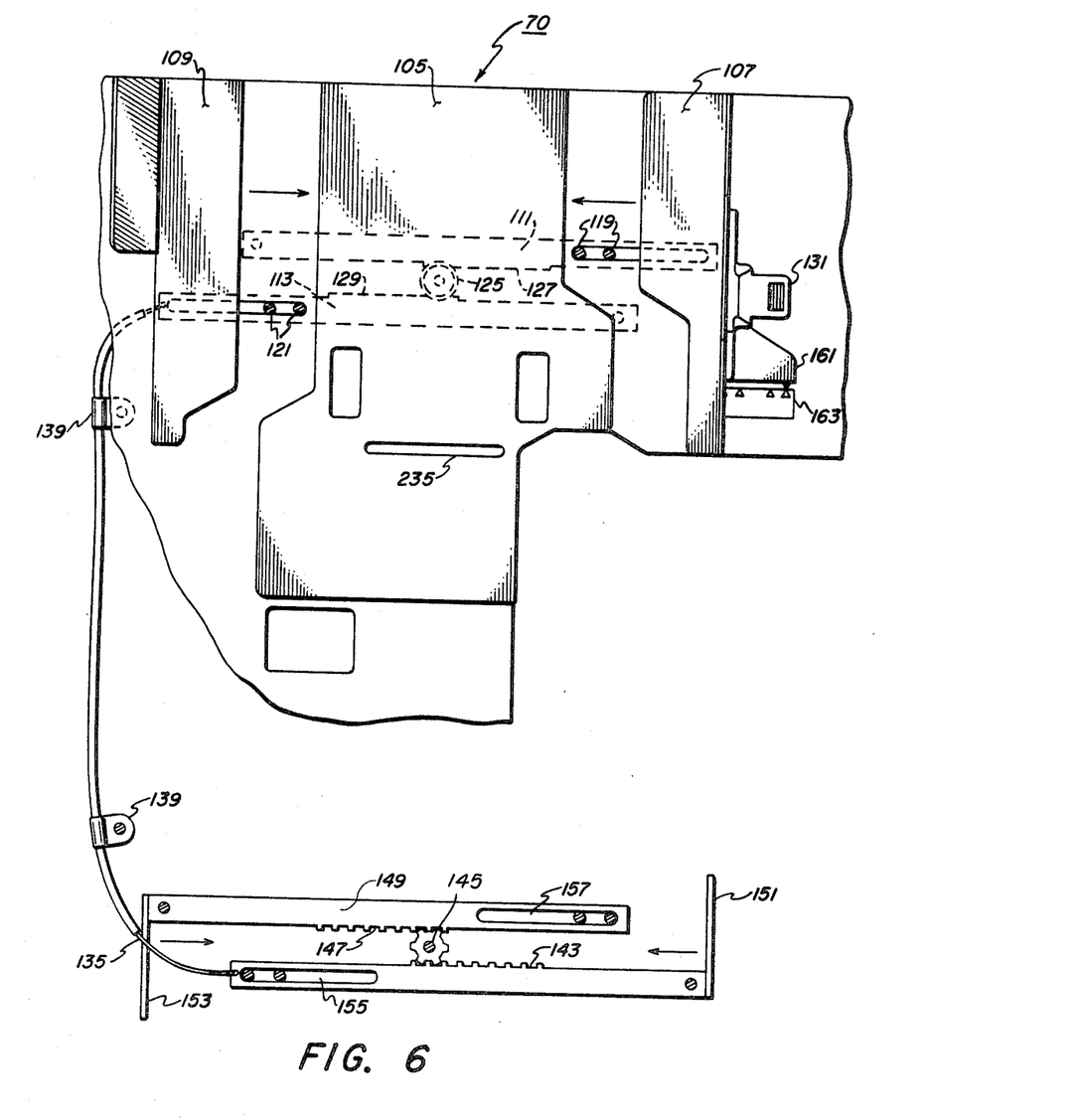
FIG. 6 is a plan view of the sheet receiving tray assembly.

Finishing apparatus 32 includes an input receiving tray assembly 70, a stapler group 72, a stapler head assembly 74, a side stacking assembly 76 and an output receiving tray assembly 78. Input receiving tray assembly 70 comprises an adjustable input receiving tray 105 which serves to guide the sheet material along a path from the processor into the finishing apparatus. The tray is adjustable for varying paper width which may accept, as for example, 8 ½ × 11 paper up to 9 × 14 paper. Tray assembly 70 has a left hand guide 107 and right hand guide 109 which are connected by a pair of bar members 111 and 113. Bar members 111 and 113 are formed with elongated slots 115 and 117, respectively, to enable sliding movement of the bar members relative to the machine frame. Pin members 119 and 121 serve to guide the bar members 111 and 113, respectively, in their movement at right angles to the sheet path. In order to ensure that the bar members 111 and 113 are moved equal and opposite distances from the centerline of the sheet path, a sprocket gear 125 secured to the frame meshes with teeth 127, 129 formed on the bar members 111, 113, respectively. To position the tray assembly, the machine operator depresses a tray release handle 131 which when engaged enables guide 107 to be moved relative to the machine frame which, in turn, moves bar 111 which, in turn, drives the gear sprocket 125 which then drives bar 113 and in equal and opposite direction from movement imparted through bar 111 thereby moving guide 109 to an equal and opposite position relative to the center line of the sheet path. It will be noted that a wire 135 received in a sleeve 137 which is clamped to the frame by clamps 139 which serve to impart movement to a bar 141 associated with the side stacking assembly 76 as will be described hereinafter. Bar 141 has teeth 143 formed therein which mesh with a sprocket gear 145 which, in turn, also meshes with teeth 147 on a bar 149 in similar fashion to bars 111 and 113. Bars 141 and 149 have guide plates 151 and 153 secured thereto and have elongated slots 155 and 157 formed therein, respectively. It will be further noted that release mechanism 131 has an indicator portion 161 which may be aligned with marks 163 on the frame to facilitate the positioning of guides 107, 109, 151 and 153 to the various widths. By this arrangement when release handle 131 is actuated, the guides 107 and 109 are moved in equal and opposite directions simultaneously. Guides 151 and 153 are moved in equal and opposite directions which are equal to the movement imparted to the guides 107 and 109 to establish the desired paper path for a desired paper width.

STAPLE GROUP ASSEMBLY

Figure 7:
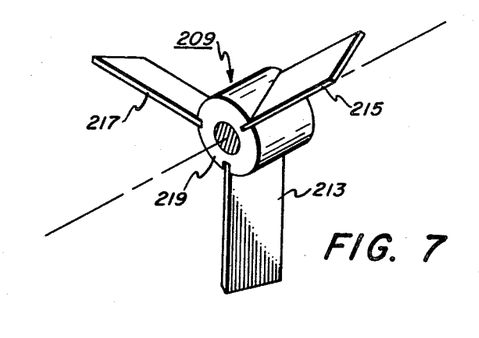
FIG. 7 is an isometric view of a paddle wheel.

The staple group assembly 72 comprises a registration gate 207 which stops the forward motion of the sheet material, a paddle wheel 209 which moves the sheet to the forward left-hand corner of the input receiving tray for stapling by stapling head assembly 74 which drives staples into the sheet material positioned on the receiving tray to produce finished booklets. Paper guides 107 and 109 which have been previously described assist in positioning the sheet material coming from the processor and received on the input receiving tray. As the sheet material is received by the receiving tray by virtue of the exit speed of the sheets from the processor, the sheets come into contact with paddle wheel 209. Paddle wheel 209 comprises three blade members 213, 215 and 217 which are connected to a hub portion 219 which is received on a shaft member 221. The blade members are made out of flexible material such as polyurethane and are formed at a helix angle $\alpha$ ranging between about 20° to about 50° and preferably from 25° to 35° along the axis of shaft 221 for a purpose that will become more apparent. The blade members have length to width ratio ranging from about 2:1 to 3:1 and preferably are about ½ inch wide and about 1 ¼ inches to 1 ½ inches long and have a thickness ranging from about .050 inch to about .100 inch and preferably from about .065 inch to about .075 inch to obtain proper blade flexing when contact is made with the sheet material at the blade tips. Shaft 221 is driven by a motor 223 through gears 225 and 227 with gear 227 driving a pulley 229 which transmits motion to a pulley 231 mounted on the shaft 221 through an "O"-ring 233.

Figures 7A, 7B:
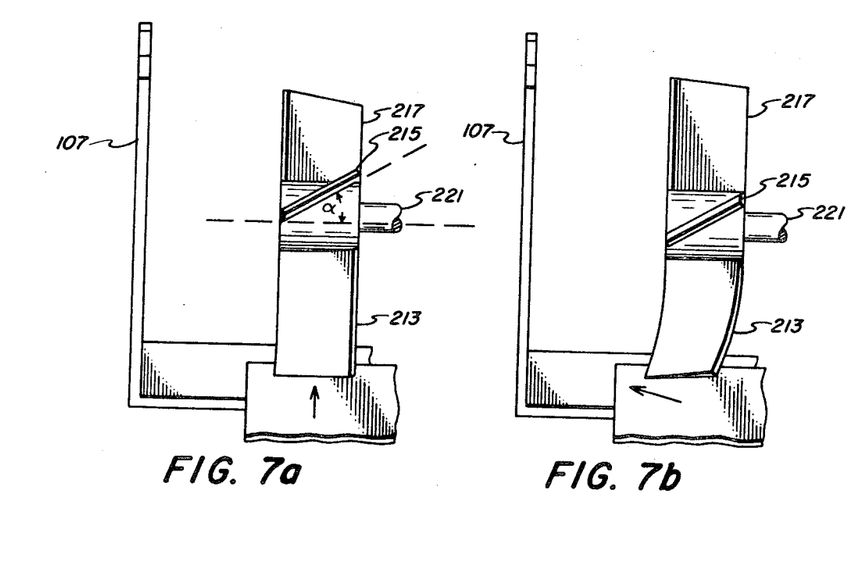
Figure 7C:
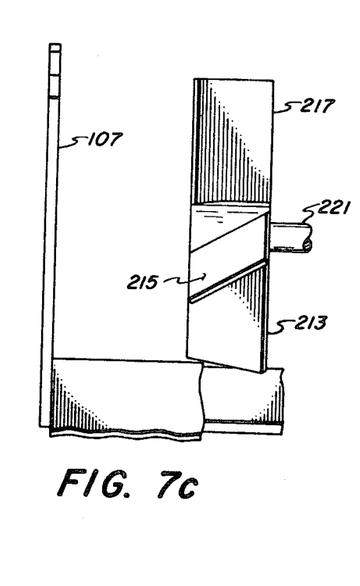

Referring now to FIGS. 7(a), (b) and (c), there is shown in sequence the movement imparted to a sheet by the paddle member 209. The sheet moves initially to the left against paper guide 107 and then forwardly as the paddle member continues to rotate on shaft 221. The sheet is contacted by the outer tip of the blade 213. Due to the helix angle of the blade with the shaft axis and the unique shape and thickness of the blade, the blade is caused to flex to the outside or to the left looking at the figures which imparts a force on the sheet to the left carrying the sheet against the paper guide 107. As the blade member 213 continues to rotate, the outside tip moves out of contact with the sheet and the inner part of the blade is placed in contact with the sheet causing a forward force to be imparted to the sheet in the direction at which the paddle member is being rotated moving the sheet up against a gate member 207. The inner portion of the paddle member 213 does not flex to the same degree as the outer portion by virtue of the fact that the outer portion commences to return to its original shape after being flexed against the sheet thereby tending to impart a force against further flexing of the blade member in a sideways direction or to the left. As a result, the trailing portion or right-hand portion of the blade member serves to carry the sheet in a forward direction against the gate 207. Since the blade members 213, 215 and 217 are continuously acting on sheets, there is a continuous action piling sheets to the left against guide 107 and gate 207 thereby ensuring that sheets received onto the tray are collected in registration for stapling.

Gate 207 stops the forward motion of the sheet material and is received in a slot 235 formed in the input receiving tray. Gate 207 is maintained in a rest position in slot 235 by the action of a spring 237 and can be actuated to a raised position above the sheet path by the energization of a solenoid SOL-1. The stapling head assembly 74 places staples into the sheets collected on the input receiving tray having been positioned in corner registration against paper guide 107 and gate 207. For a detailed description of the stapling operation, reference is made to copending application Ser. No. 70,735 filed on even date with the instant application and commonly assigned.

SIDE STACKING AND OUTPUT RECEIVING TRAY ASSEMBLIES

Figure 8:
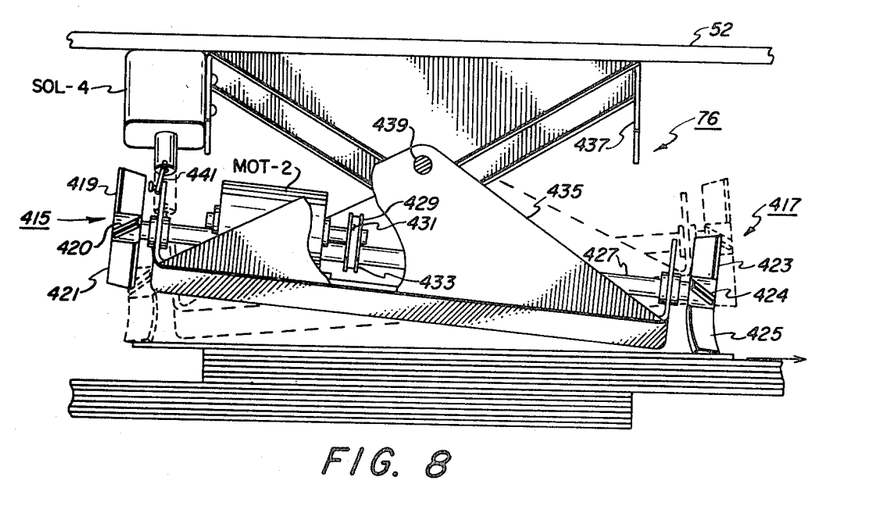
FIG. 8 is a side view of the side stacking assembly.
Figure 9:
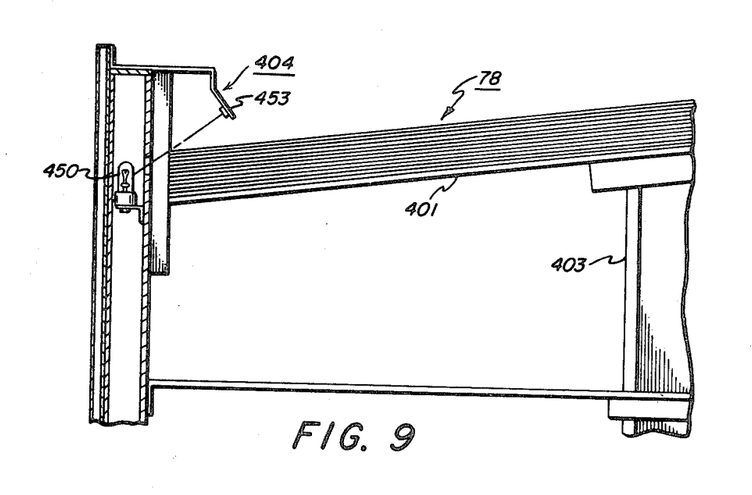
FIG. 9 is a side view of the output receiving tray assembly illustrating details of the elevation control thereof.

Side stacking assembly 76 cooperates with output receiving tray assembly 78 to stack sheets in separately indentifiable bundles instead of in stapled booklets at the option of a machine operator. Tray assembly 78 includes a tray 401 positioned at about a 7 ½° angle to the horizontal to facilitate receiving sheets fed along the transport path. Tray 401 is mounted in the frame for sliding movement in a vertical plane on slide shaft 403. The tray is lowered as the sheets are received to maintain a uniform level with the transport path by an elevator control system 404 as will be described hereinafter.

The level of tray 401 is controlled by elevator control system 404. Elevator control system 404 includes a pair of lamps 450 and 451 and corresponding phototransistors 453 and 454, respectively, and an associated control circuit to be described including a reversible motor MOT-3. To move the tray the motor MOT-3 is energized to rotate a pulley 457 which carries a cable 459 connected to slide shaft 403. On the down movement during the side stacking operation, motor MOT-3 is only energized in brief intervals to effect incrementally lowering the tray due to a braking action on the motor when power is shut off. Level control is effected by signals received from phototransistors 453 and 454 which provide signals to the control circuit when darkened. It will be noted that lamps 450 and 451 direct a beam of illumination across the top leading edge of the sheets toward their corresponding phototransistors. By this arrangement, the tray is caused to be lowered until such time as light is received by the phototransistors at which time power to motor MOT-3 will turn off.

Side stacking assembly 76 serves to stack the sheets into shingled or offset bundles on tray 401. The side stacking assembly comprises a pair of pivotable paddle wheels 415 and 417 which are similar in construction to paddle wheel 209. Paddle wheel 415 has blade members 419, 420, and 421 and paddle wheel 417 comprises blade members 423, 424 and 425. Paddle wheels 415 and 417 are mounted on a shaft 427 which is driven by a motor MOT-2 through the pulley 429 which receives a belt 431 which is wrapped around another pulley 433 mounted on the shaft 427. In this manner, the paddle wheels 415 and 417 are continuously rotated so that the blade members are advanced into contact with the topmost sheet received on tray 401 such that a sideways and ahead movement is imparted to the sheet as previously described in the case of paddle wheel 209.

Each of the paddle wheels 415 and 417 may be alternately positioned to contact with the sheets advanced onto the tray depending upon whether the sheets of the topmost bundle are to be stacked on the left or right of the tray. To accomplish this, the shaft 427 is supported in a frame 435 which is suspended from a similar frame 437 on a pivot pin 439. Secured on one end of the frame 436 is actuating arm 441 which is connected to a solenoid SOL-4. Upon receiving a signal as will be described hereinafter, solenoid SOL-4 actuates arm 441 to cause the frame 435 to pivot on pivot pin 439 so that paddle wheel 417 is in contact with the sheets received onto the tray causing them to be stacked to one side. At the proper interval, solenoid SOL-4 is de-energized which causes frame 435 to pivot due to the weight of motor MOT-2 and paddle wheel 415 to be placed into contact with the oncoming sheets resulting in stacking towards the opposite side. By repeating this sequence, offset stacks or bundles are formed of the sheet material received onto the tray.

MACHINE OPERATION

Figure 1A:
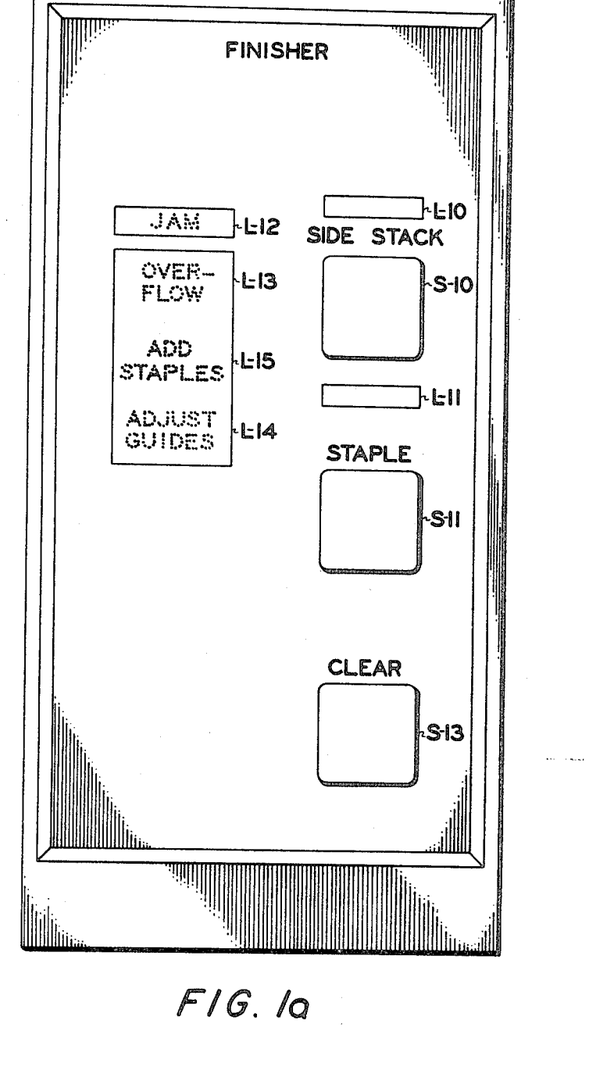
FIG. 1(a) is a view of the machine control panel section for the finishing apparatus.
Figure 10:
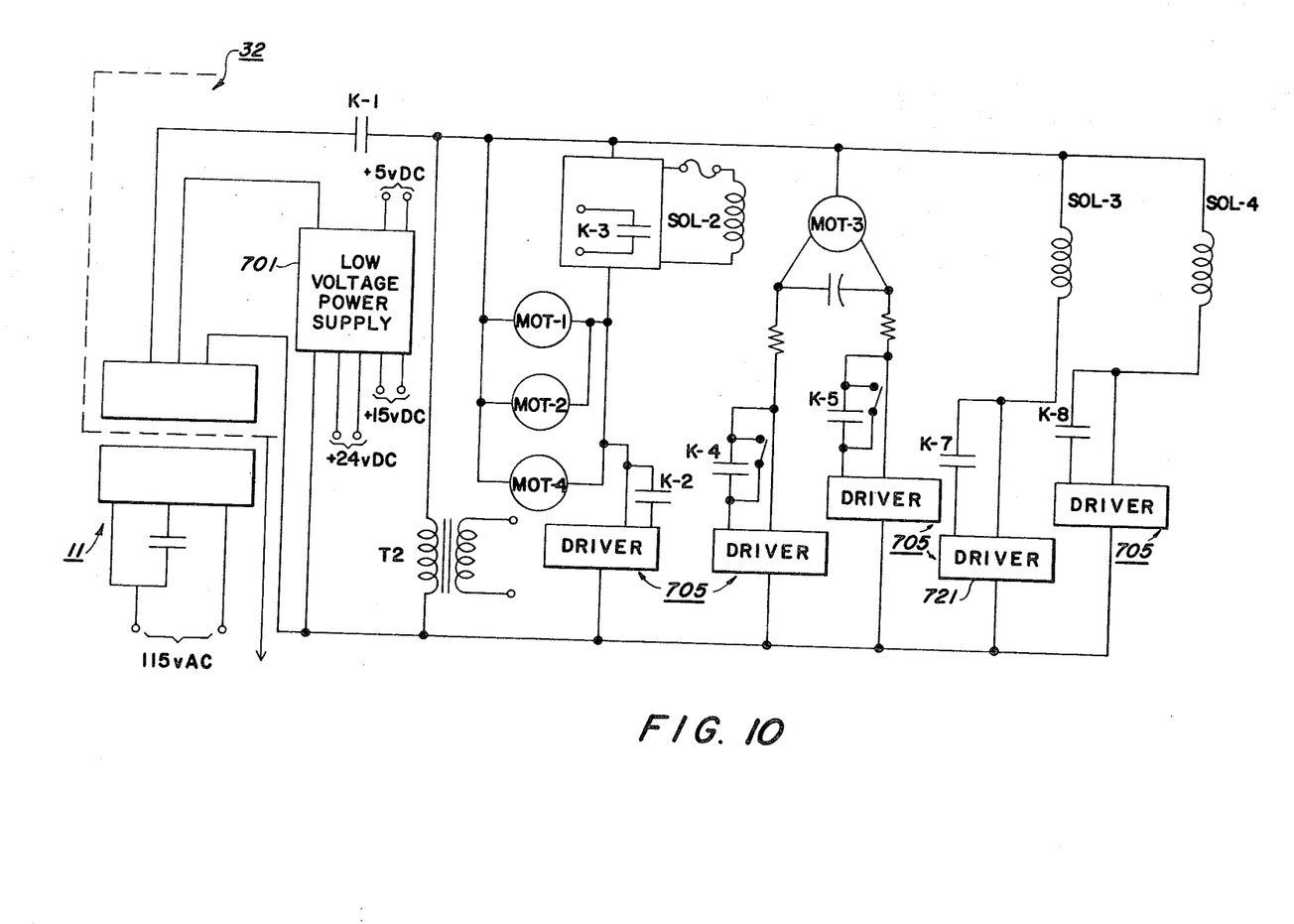
FIGS. 10, 11, and 12 are diagrams of the control circuits of the finishing apparatus.
Figure 11:
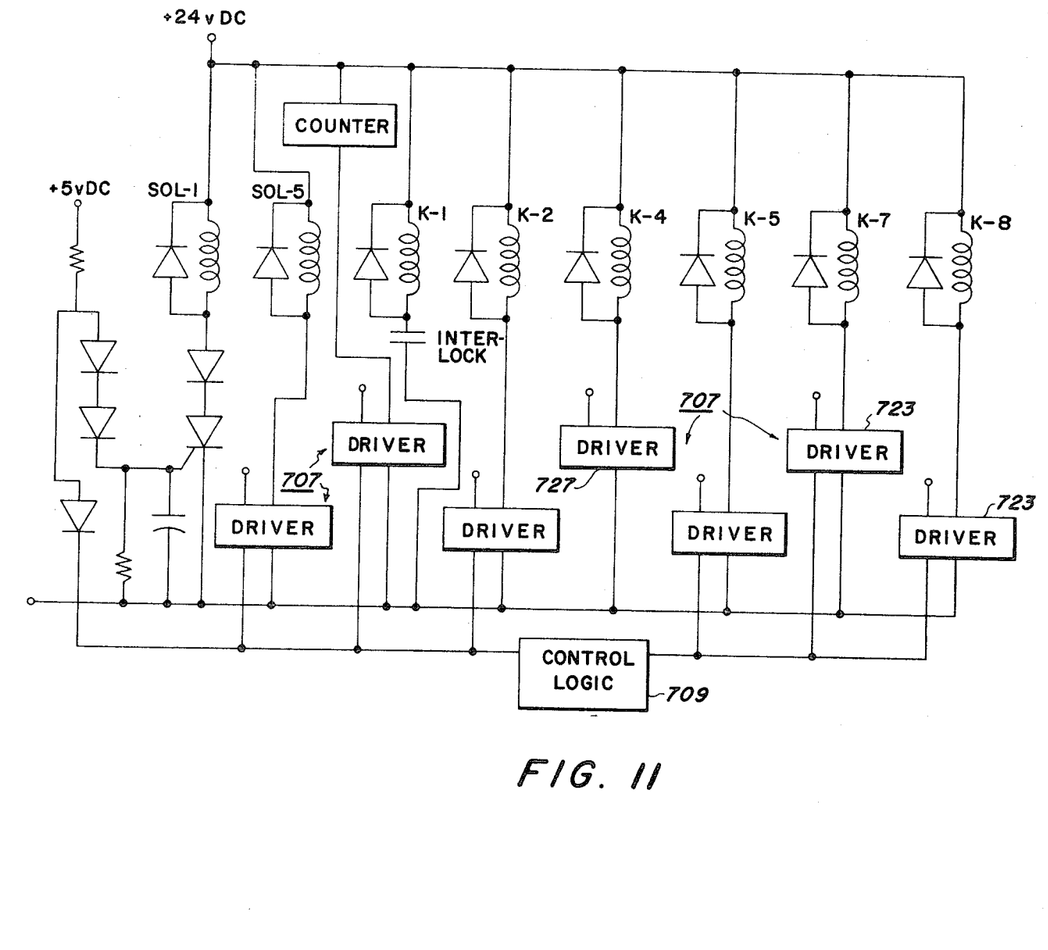
Figure 12:
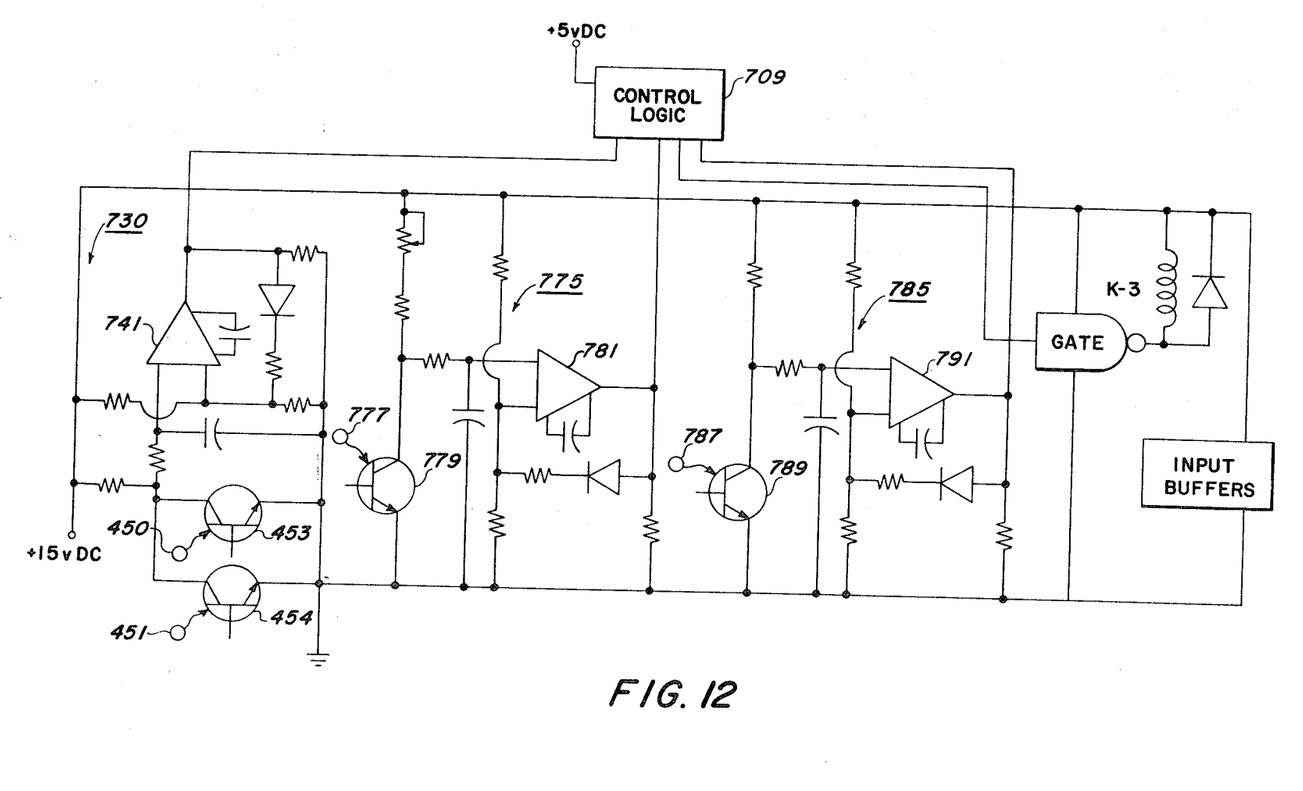

An understanding of the machine operation of the finishing apparatus may best be understood in connection with the circuit diagrams in FIGS. 10 to 12 and the finishing apparatus control panel in FIG. 1(a). The processor has a control section for the finishing apparatus for selecting the mode of operation of the finishing apparatus in either the stapling mode or the side stacking mode. On the control panel are switches S10 and S11 for machine operator to select one of the two modes of operation. Also included in the control panel are indicator lamps L10 and L11 to indicate when the finishing apparatus is in either of these modes of operation. A clear switch S12 is provided to enable the finishing apparatus selection to be dropped if the processor is in a standby mode or if it is in a hold mode such as in the case of a jam. Also included on the control panel is a lamp L12 to indicate a jam has occurred at the finishing apparatus and a lamp L13 to indicate that either of the input or output receiving trays is in a overflow condition with too much sheet material received therein. Another lamp on the control panel L14 indicates that there is a misregistration between the paper size of the processor and the finishing apparatus and also a lamp L15 to indicate a low staple condition in the stapling head assembly. When the processor is turned on the finishing apparatus receives power through a relay K1. To actuate relay K1 power is received from a low voltage power supply 701 which serves to energize a coil to pull in a contact K1 of the relay K1 which allows power to be received by A/C drives 705. The low voltage power supply 701 also provides power to D/C drivers 707 and a conrol logic 709 coupled to the D/C drivers. When the contact K1 of relay K1 is closed, power is available to the eject motor MOT-1, paddle wheel motor MOT-4, the elevator motor MOT-3, the side stack paddle wheel motor MOT-2, the eject solenoid SOL-3, the side stack solenoid SOL-4, the lamp drive transformer T2, and the transformer T1 and bridge rectifier CR1 of the staple drive circuit.

In the stapling mode of operation, the staple switch S10 of the control console is depressed. When the processor commences printing, control logic 709 supplies a signal to a driver 705 which energizes a relay K2. Relay K2 energizes contact K2 which turns on motors MOT-1, MOT-2, MOT-4, and transformer T1 and bridge rectifier CR1. When this occurs the copies from the processor entering the finishing apparatus are received on the input receiving tray 105 and each copy contacted by the paddle wheel 209 which then urges the copy sheet forward and to the left against the guide 107 and the registration gate 207. Succeeding copies are fed on top of the preceding sheets by the paddle wheel 209 which is driven by the motor MOT-4. When the last sheet of a stack is received in the tray, the control of the processor indicates that this condition exists to the control logic 709 which then actuates a relay K3. When relay K3 is actuated, a staple driving circuit is turned on and the coil of the solenoid SOL-3 energized which causes the stapling head assembly to be actuated into a stapling operation. When this occurs, a staple from the staple roll is severed and fastened to the sheets. Relay K3 is then de-energized to de-energize the coil of the solenoid SOL-3 which returns the stapling head assembly to its rest position and at the same time advances the feed of the staple roll to position the next staple for the next stapling operation due to the action of staple feed finger 357. When the staple head assembly starts to return to its rest position, the control logic 709 provides a signal to a driver 711 which is coupled to the gate solenoid SOL-1. When SOL-1 is energized, gate 207 is retracted in an upward position out of the path of the sheets. At the same time, a signal is provided to the coil of solenoid SOL-3 which is energized by a driver 721 which is energized by driver 723. When this occurs, eject rolls 380 and 381 are actuated against the idler rolls 393, 394 to eject the stapled stack of sheets in a direction toward the output receiving tray 401. Exit rolls 390, 391 and idler rolls 396 and 397 cooperate to maintain control of the sheets along its transport path into the receiving tray as they leave the eject rolls 380 and 381. As the stacks of sheets which are now stapled booklets are received by the receiving tray 401, the tray is lowered incrementally to maintain the level of the topmost sheet on the tray at a predetermined height with the transport path. Paddle wheel 415 contacts the stapled stacks to help guide the sheets into the output receiving tray.

In order to ensure that the receiving tray 401 is lowered at the proper time intervals, there is a control circuit coupled to elevator motor MOT-3 which is energized when a coil of relay K4 is energized to pull in a contact K4. In order for the control logic 709 to provide a signal to a driver 727 for energizing relay K4 a signal is received from a sheet stacking sensing circuit 730 which includes phototransistors 453 and 454 which receive illumination from lamps 450 and 451, respectively. Illumination from the lamps 450 and 451 in such as to impinge on the phototransistors 453 and 454 when the tray 401 is at the proper elevation. Thus, the sheets start to collect, the path of illumination is blocked and the resistance of the phototransistors increased. When this occurs, an output signal is generated to operational amplifier 741 which is set at a voltage level to provide an output signal to the control logic 709. It will be noted that for this condition to occur, both of the phototransistors 451 and 453 must be blocked for a resistance increase to occur in both before and output signal is sent to control logic 709. Desirably, lamp 451 is turned off during the stapling mode since the thickness of the staples on the same side assures reliable operation with lamp 450 only. Motor MOT-3 has a brake which normally engages when power is not received as known by those skilled in the art. In this manner, the movement of the tray is incremental to provide a smooth reliable operation in a downward direction.

For a side stacking mode of operation, side stack switch S11 on the control panel is pressed. When this occurs, the eject roll motor MOT-1 is energized to rotate eject rolls 380 and 381 and the side stack motor MOT-2 energized to rotate paddle wheels 415 and 417 through a closing of a contact K2 which is caused when a relay K2 is energized from control logic 709. At the same time, a signal is received by the gate solenoid SOL-1 to pull the gate into an upward position out of the path of the sheets. At the same time, a signal is received by a relay K7 to close a contact K7 to energize eject solenoid SOL-3. As sheets are received in the receiving tray 205, the sheets are advanced by the eject rolls 380, 381 and the exit rolls 390 and 391 to feed the sheets directly to the output receiving tray 399. As the sheets are fed through the exit rolls, the sheets are driven sideways to the right by the side stack paddle wheel 417. A signal is received from the processor to control logic 709 to cause a signal to be sent to a relay K8 which when energized closes a contact K8 to energize solenoid SOL-4 which, in turn, causes the side stack paddle wheel 417 to be lowered into contact with the sheets and side stacked bundle commences. At the completion of the run, solenoid SOL-4 is de-energized and the side stack paddle wheel 415 lowered due to its weight into contact with the sheets causing the side stack paddle wheel 417 to be raised.

By continued actuation and de-actuation of the solenoid SOL-18 in accordance with the control logic, the sheets received onto the output receiving tray are stacked to the left or to the right to form offset bundles or stacks corresponding to the input information received by the processor. Tray 401 is incrementally depressed downwardly in the same manner as described in connection with the stapling mode of operation except when stacking with paddle wheel 415, both lamps 450 and 451 are energized. When stacking with paddle wheel 417, lamp 450 is energized only as in the case of the stapling operation for a more reliable operation. Upon completion of a run in either the stapling mode or the side stacking mode, control logic 709 de-activates relay K2 which, in turn, opens a contact K2 to de-energize eject roll motor MOT-1, paddle wheel motor MOT-4 and the side stack motor MOT-2. At the same time, if in the side stack mode of operation, relay K7 is de-energized to open a contact K7 to de-energize the solenoid SOL-1 for eject rolls and solenoid SOL-3 for returning the gate to a rest position.

A signal is then supplied to a solenoid SOL-5 which serves to release the cover 52 from its locked condition against the action of springs 57. It should be noted that when the cover solenoid SOL-5 is energized, the cover is released to a position slightly above the level of its normally closed position which then causes the solenoid SOL-5 to be de-energized by control logic 709. The machine operator then raises the cover 52 to its fully open position closing a switch S5 causing a relay K5 to be energized which closes a contact K5. When contact K5 closes, this energizes motor MOT-3 to reverse its drive and raise the tray 401 to its fully elevated position in which the sheet material is brought directly upward to facilitate the removal thereof from the finishing apparatus. When the tray 401 reaches its original starting position, the relay K5 is de-energized by the control logic 709 to open contact K5 thereby de-energizing motor MOT-3.

JAM DETECTION

Jam detection is provided for in the control circuit by a level detecting circuit 775 which serves to signal control logic 709 when sheets are present in the vicinity of the gate 207. To accomplish this, a lamp 777 is positioned in the sheet path to provide illumination toward a phototransistor 779 which is coupled to an operational amplifier 781. When sheets are present in the sheet path, illumination from lamp 777 is blocked and the resistance of phototransistor 779 increased which causes the operational amplifier 781 to increase in voltage resulting in a change in state on the output side of the operational amplifier. When this happens, control logic 709 times out to indicate that a jam has occurred in the finishing apparatus and supplies a signal to the processor to turn it off. Also, the control circuit includes a low staple detect circuit 785 which serves to indicate to the control logic 709 when a low staple condition has occurred in the staple head assembly. To accomplish this, a lamp 787 is positioned to provide illumination to a phototransistor 789 when the staple roll shows no staples are present which causes the resistance of the phototransistor 789 to increase and the output condition of an operational amplifier 791 to change which condition is indicated to the control logic 709.

Control logic 709 includes a counter for counting the sheets transported along the sheet path into the finishing apparatus so that an overflow condition can be detected. When this occurs, a signal is supplied to the processor apparatus to indicate that an overflow condition exists to turn the processor off.

What is claimed is:
1. Sheet stacking apparatus comprising
   tray means for receiving sheet material transported along a sheet path and adapted for lowering as sheet material is received thereon,
   a frame pivotally mounted in overlying relation to said tray means,
   shaft means journaled in said frame for rotation relative thereto,
   paddle means including a plurality of flexible blade members mounted on each end of said shaft means,
   control means to cause said frame to pivot to position a one of said paddle means and then the other into contact with a corresponding side of the sheet material being received in said tray means at predetermined intervals so that a sideways force may be imparted to the sheet material at right angles to the sheet path.
2. Apparatus according to claim 1 wherein said tray means includes a sensing circuit for maintaining a constant level of sheet material being received thereon.
3. Apparatus according to claim 2 wherein said shaft means is continuously driven by a motor positioned at one end thereof.
4. Apparatus according to claim 3 wherein said control means includes a solenoid which receives discrete electrical signals and a solenoid actuated member connected to said shaft means at one end thereof.
5. In a copier machine for producing collated sets of copies from documents advanced from a supply source to a platen and then returned to the supply source in repeated cycles, sheet stacking apparatus comprising
   tray means receiving sheet material transported along a sheet path and adapted for lowering as sheet material is accumulated thereon,
   a frame pivotally mounted in overlying relation to said tray means,
   shaft means journaled in said frame,
   paddle means having a plurality of flexible blade members mounted on each end of said shaft means for rotation therewith, and
   control means to cause said frame to pivot to position a one of said paddle means and then the other onto contact with a corresponding side of the sheet material being received in said tray means at predetermined intervals so that a sideways force may be im- parted to the sheet material at right angles to the sheet path.

6. A method of stacking sheets into separated bundles comprising the steps of collecting sheet material transported along a path in a receiving tray, contacting the sheet material surface with rotating members positioned at the sides of the sheet path by pivoting the members to a first position to contact the sheet material surface first on one side and then to a second position to contact the sheet material surface on the other side at predetermined intervals so that a sideways force is imparted to the sheet material, and continually lowering the receiving tray to effect a constant level with the sheet path.

* * * * *